(12) United States Patent  
Orlowski et al.

(10) Patent No.: US 7,090,403 B2
(45) Date of Patent: Aug. 15, 2006

(54) ARTICULATED SEAL

(75) Inventors: David C. Orlowski, Milan, IL (US); Neil F. Hoehle, Solon, IA (US)

(73) Assignee: Isotech of Illinois, Inc., Rock Island, IL (US)

(*) Notice: Subject to any disclaimer, the term of this patent is extended or adjusted under 35 U.S.C. 154(b) by 106 days.

(21) Appl. No.: 10/177,067

(22) Filed: Jun. 21, 2002

(65) Prior Publication Data

US 2003/0235354 A1 Dec. 25, 2003

(51) Int. Cl.
*F16C 23/04* (2006.01)
(52) U.S. Cl. .................. 384/213; 384/206; 384/192
(58) Field of Classification Search ......... 384/192–214
See application file for complete search history.

(56) References Cited

U.S. PATENT DOCUMENTS

| 3,240,502 | A | * | 3/1966 | Snyder | 384/192 |
| 3,243,212 | A | * | 3/1966 | May | 384/203 |
| 5,636,849 | A | * | 6/1997 | Jonsson et al. | 384/192 |
| 5,799,950 | A | * | 9/1998 | Allen et al. | 384/213 |
| 6,004,037 | A | * | 12/1999 | Harris et al. | 384/206 |

* cited by examiner

*Primary Examiner*—Thomas R. Hannon
(74) *Attorney, Agent, or Firm*—Jay R. Hamilton

(57) ABSTRACT

A combination of a bearing isolator shaft and housing with a stator member affixed to said housing, a plurality of spherical faces or interfaces between said rotor and said stator, said spherical interfaces having identical center points between said shaft and radially responsive to each other as radial movement of said rotor member occurs whereby said spherical surfaces are continually intermeshed and maintained at a constant distance from each other.

17 Claims, 3 Drawing Sheets

MAXIMUM RADIAL DISPLACEMENT

ARTICULATED SEAL

BACKGROUND OF THE INVENTION

For years there have been a multitude of attempts and ideas for providing a satisfactory seal when a shaft is angularly misaligned from the bore and the shaft runs out.

The problem is especially acute in air barrier seals where the shaft to bore misalignment is maximized. The solution requires both the tight running clearance between the seal members and the stationary member and a loose running clearance for adjustment for operational conditions especially misalignment of the shaft with respect to the stator or stationary member.

Prior uses of air pressure to seal both liquid and solid materials have not been entirely satisfactory because of the inherent tight clearance necessary to create the required air pressure in the seal greater than the pressure of the product on the other side of the seal.

This is to say that to ensure proper sealing, i.e. the tighter the seal less volume of air is required to maintain the seal against the external pressure of material.

Shaft misalignment is also a problem with contact seals with the contact resulting in greater wear due to the misalignment. Abrasiveness of the product also affects the wear pattern and the useful life of the seals.

Thus the seal operates with a low or tight running clearance that can be maintained when the operational demands result in misalignment of the rotating shaft with respect to the fixed element occurs. This invention provides a tight seal for air and or fluids barrier seals over a relatively large range of misalignment of the shaft to the bore. This tight seal can also be used with contact seals to augment the performance by redistributing the friction equally as the surface face is maintained at a predetermined tight clearance even as misalignment occurs.

DETAILED DESCRIPTION OF THE PREFERRED EMBODIMENT OF THE INVENTION

Figure 1:
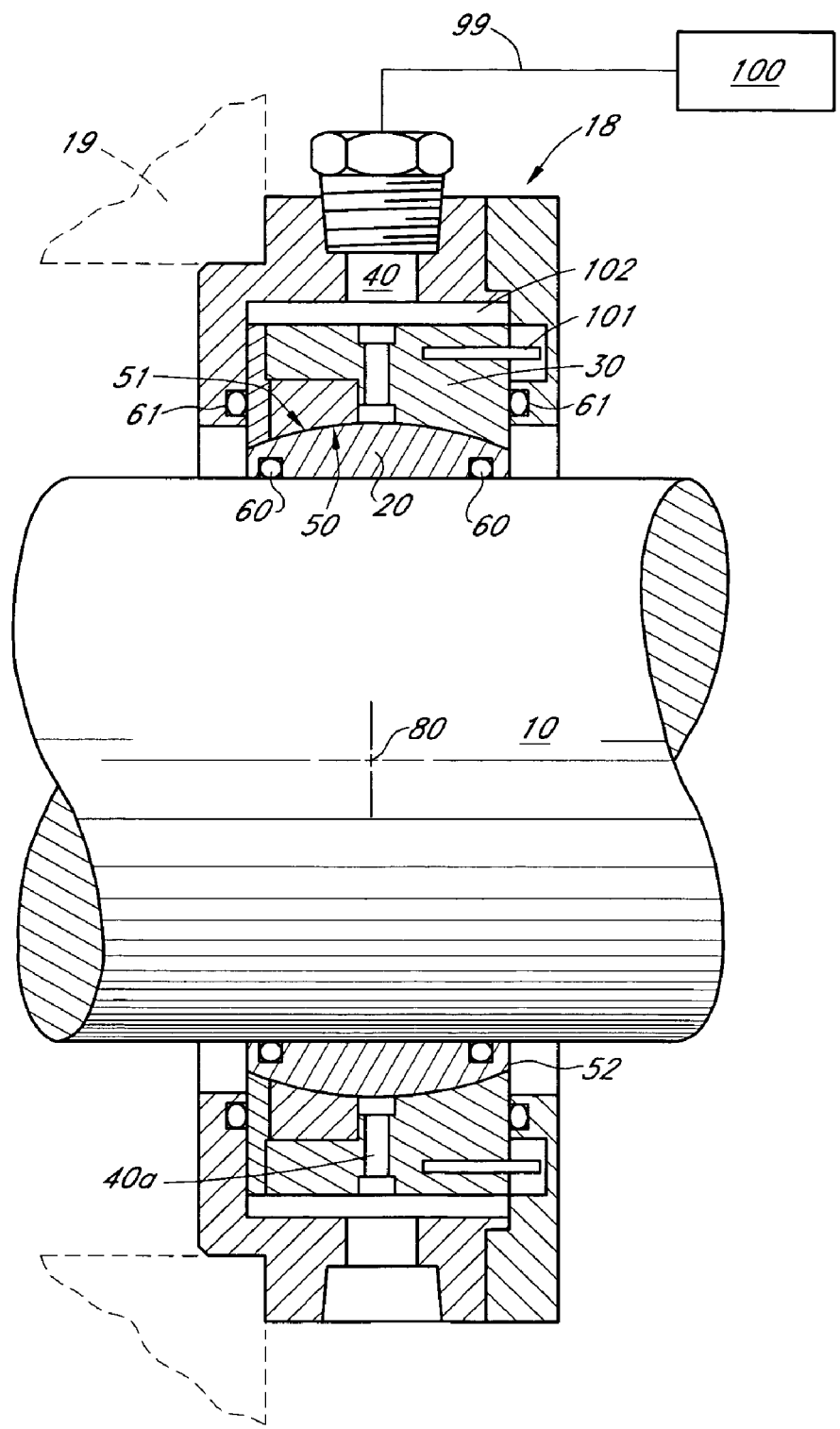
FIG. 1 is a sectional of view of one embodiment of the invention with the shaft aligned

FIG. 1 shows the bearing isolator 18, mounted on a shaft 10, the shaft 10 extends through the isolator 18 and the housing 19, and a source of gas or fluid 100 which may include water or lubricant and conduit 99. The novel isolator seal of this invention is shown with the stator 30. The rotor 20 is rotatively affixed to the shaft 10 by means by a frictional seal 60. The rotor 20 follows the rotational movement of the shaft 10 because of the frictional engagement of the seals 60. The passages 40 and 40a are as shown but will not be described in detail here because such description is already understood by those skilled in the art.

Figure 4:
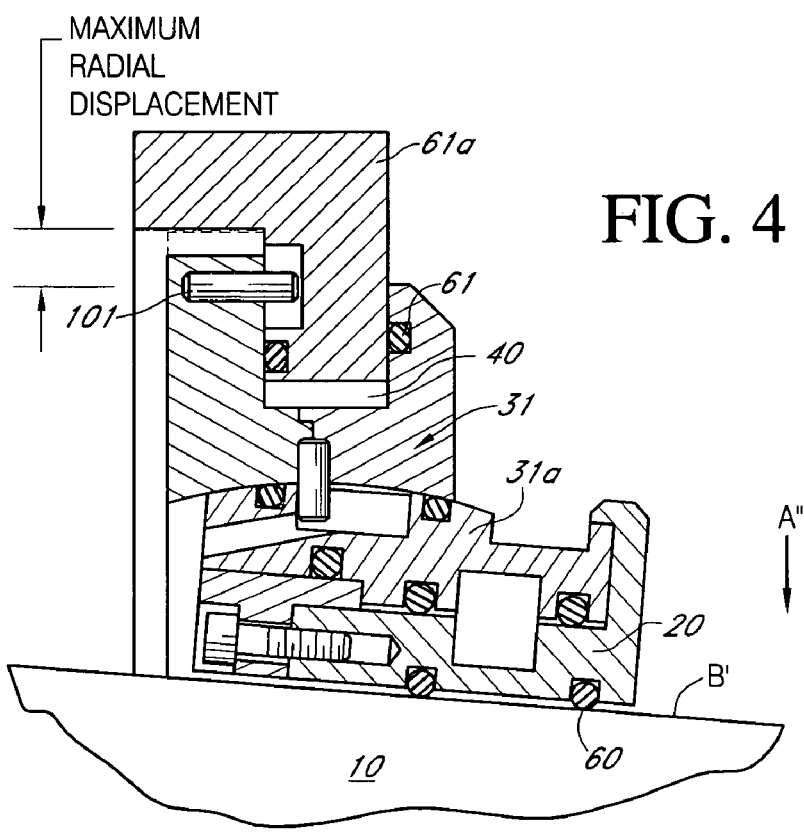
FIG. 4 is a sectional view of FIG. 2 of the invention showing the shaft misaligned.
Figure 3:
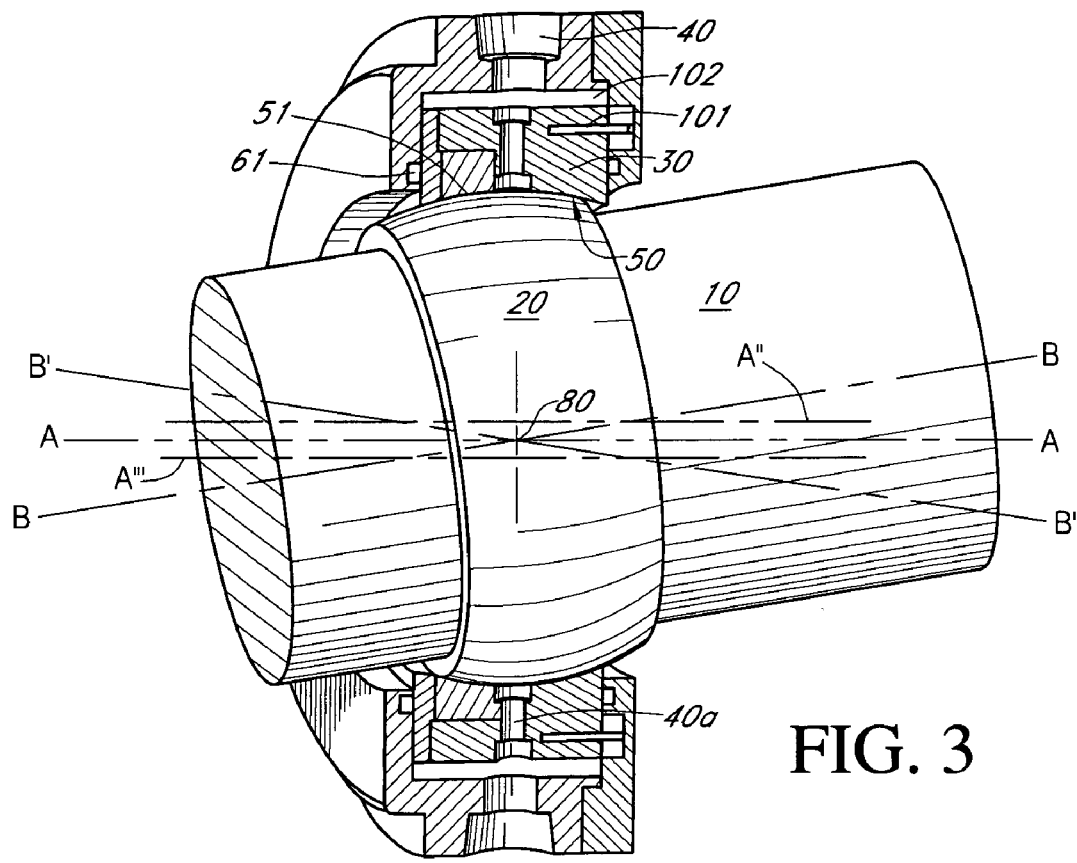
FIG. 3 is a sectional view of the preferred embodiment of FIG. 1 with the shaft misaligned at various angles.
Figure 5:
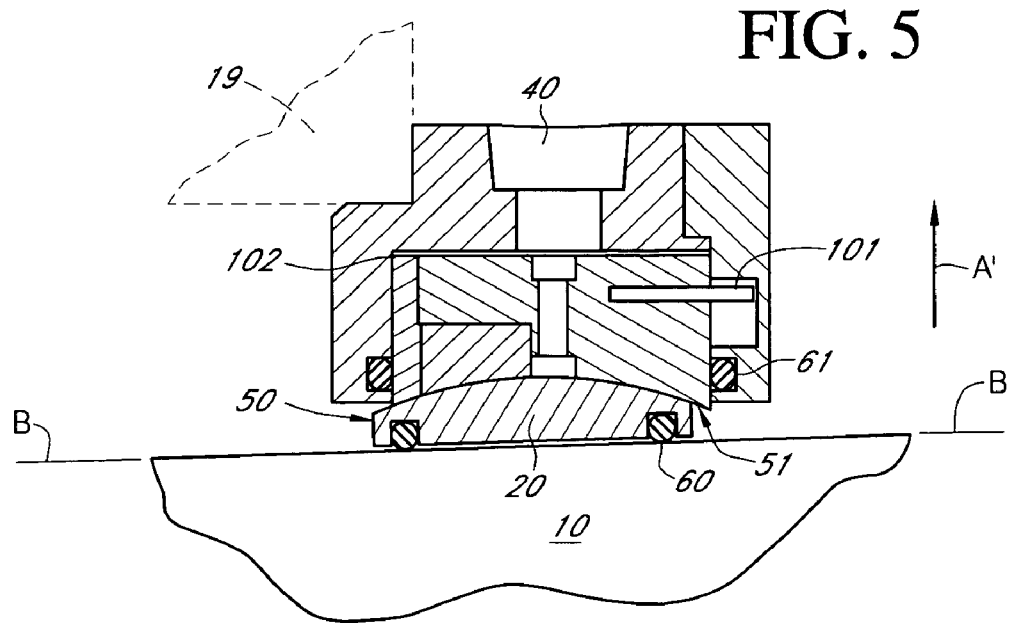
FIG. 5 is a sectional view of the embodiment of FIG. 1 showing the shaft misaligned.

The basic novelty of this invention includes the utilization of a pair of spherical surfaces, faces or interfaces 50 and 51 to create a self aligning tight radial clearance between the rotor 20 and the stator 30 prior to and after use. This clearance 52 is maintained at a constant value even as the shaft 10 becomes misaligned during use. Various amounts and direction of misalignment between shaft centerline and housing are illustrated in FIGS. 3, 4 and 5. FIG. 3 in comparison to FIG. 5, demonstrates the change in clearance 102 in response to radial force, horizontal and vertical, upon bearing isolator 18.

Thus spherical faces 50 and 51 have a center point identical from the face; however, the faces are radially or as shown vertically spaced apart. These spherical faces 50 and 51 are able to move radially as shown vertically in response to and in connection with or in concert with the radially positioning of component or structural mechanisms which provides that the stator 30 responds to radial movement of the rotor 20 when shaft 10 is misaligned with respect to the housing 19.

Figure 2:
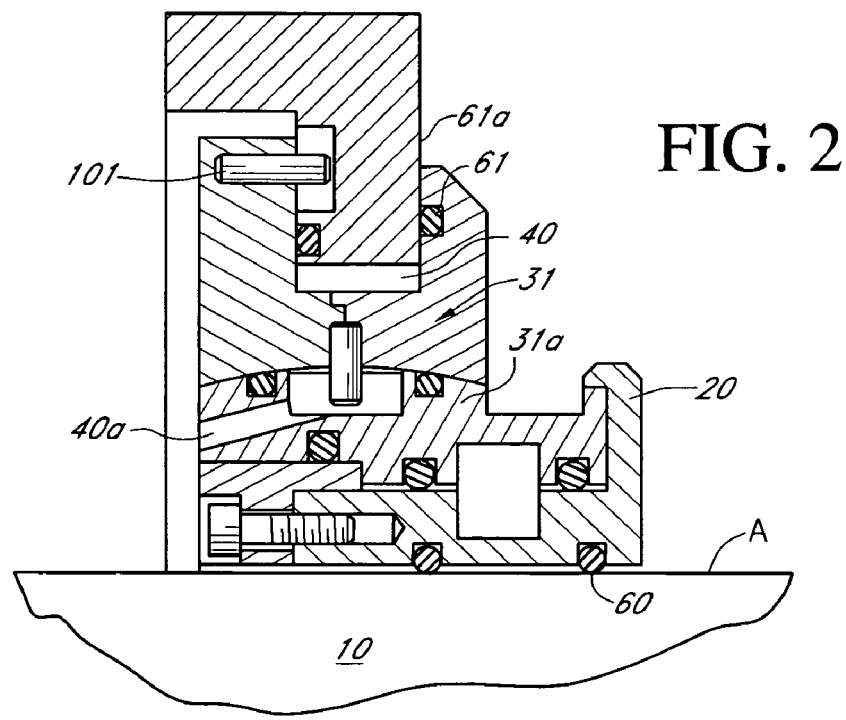
FIG. 2 is a sectional view of another embodiment of the invention with the shaft aligned along the axis.

FIGS. 4 and 5 illustrate that as the rotor 20 is moved radially as shaft 10 is misaligned with respect to housing 19 the radial movement is transferred across the spherical face 50 to face 51, and the resultant force vertical or radial moves stator 31 or 31A in FIGS. 2 and 4 respectively radially an amount sufficient to keep the center points of the spherical faces at the same radial distance from the spherical faces. FIGS. 2 and 4 have a stator portion 31A which may be and is a separate journal type bearing between the rotor 20 and the stator portion 31A to translate the radial motion of the rotor 20 when misalignment occurs to the stator 31.

In order to provide for controlled radial movement of the stator 31 stationary flange unit 61A connects the seal to the housing not shown. Radial movement of stator 30 is prevented by anti-rotational pins 101. The stator is frictionally held in position by means of member 61 which can be made of any material with sufficient elasticity and frictional characteristics to hold the stator 31 in a fixed radial position but still be responsive to the radial or vertical pressure when the shaft is misaligned. Changes to the radial position of the stator and the resulting position of the stator interface occurs until the radial or vertical pressure is accommodated. In operation and as shown in FIGS. 4 and 5, the rotor 20 is moved radially as shaft 10 is misaligned with respect to the housing. Vertical or radial movement of the interface 50 results from this pressure. FIG. 3 shows the resultant vertical or radial movement of center point 80 of the lower interface or interface 50 and 51, as the shaft 10 is misaligned. This moves the centerline of the shaft from AA to A prime or A double prime. The movement is shown as the line B or BB prime. The radial and vertical movement of the center point of the spherical surfaces from line A to A prime or A double prime results when the shaft is misaligned. The computable radial or vertical movement of the spherical face 50 and the subsequent radial or vertical movement of the same center point of the second spherical face 51 an equal amount. The radial and the distance between the two spherical faces 50 and 51 are maintained as a constant.

The physical dimensions of the radial surfaces 50 and 51 may vary in linear value and distance from the centerpoint. These variations will be utilized to accommodate different sizes of shafts and seals and different amounts of misalignment.

This invention thus provides constant value of sealing as the distance between the spherical faces is maintained as a constant regardless of misalignment of a normal or design nature. Prior art made no provision for a constant value of the seal, air or otherwise, as misalignment occurred.

Variations and other aspects of the preferred Embodiment will occur to those skilled in the art all without departure from the spirit and scope of the invention.

What is claimed is:

1. A combination of bearing isolator, shaft and housing comprising:
   a. said shaft extending through said housing;
   b. a stator member having a spherical face;
   c. an annular rotor member having a spherical face, said rotor member rotatively connected to and surrounding said shaft;
   d. a spherical interface intermeshed between said stator spherical face and said rotor spherical face wherein said stator spherical face and said rotor spherical face have the same center point;
   e. a passage placed within said stator, said passage connecting the exterior of said stator to said spherical interface; and,
   f. said stator spherical face and said rotor spherical face moveable at said spherical interface in response to misalignment of said shaft with said housing while said stator is prevented from rotation.

2. The invention as set forth in claim 1, wherein said combination includes a source of fluid.

3. The invention as set forth in claim 2, wherein said combination includes a source of gas.

4. The invention as set forth in claim 3, wherein said source of gas is applied to said spherical interface via said passage.

5. The invention as set forth in claim 2, wherein said source of fluid is connected to said spherical interface via said passage.

6. The invention as set forth in claim 2, wherein said source of fluid is water applied to said spherical interface via said passage.

7. The invention as set forth in claim 2, wherein said source of fluid is a lubricant applied to said spherical interface via said passage.

8. The invention as set forth in claim 1, wherein said rotor exerts a radial force on said stator to cause said spherical interface to respond to said force.

9. The invention as set forth in claim 8, wherein said spherical faces move radially a distance and direction determined by the degree of misalignment.

10. The invention as set forth in claim 1, wherein the stator substantially encompasses said rotor member.

11. The invention as set forth in claim 1, wherein said stator member includes a mechanism for controlling the radial movement of said stator.

12. The invention as set forth in claim 11, wherein said mechanism allows control of both the radial movement and direction of said stator.

13. A combination of bearing isolator seal, shaft, housing and sources of fluid comprising:
   a. said shaft extending through said housing;
   b. a stator member;
   c. an annular rotor member, said rotor member rotatively connected to and surrounding said shaft;
   d. a first spherical surface having a center point aligned with the center line of said shaft;
   e. a second spherical surface having a predetermined radial separation from said first spherical surface to define a clearance, wherein said second spherical surface shares said center point of said first spherical surface and wherein said first and second spherical surfaces are intermeshed and at least one of said first or second spherical surfaces is responsive to changes of the center point;
   f. a passage placed within said stator, said passage connecting the exterior of said stator to said radial separation;
   g. said first and said second spherical surfaces allowed to move radially in response to changes of said center point; and,
   h. said second spherical surface is responsive to the radial movement of said first spherical surface in emulation of the misalignment between said shaft and said housing.

14. The invention as set forth in claim 13, wherein one spherical surface is on said rotor.

15. The invention as set forth in claim 13, wherein one spherical surface is on said stator.

16. The invention as set forth in claim 13, wherein said clearance between said spherical surfaces remains constant during radial movement caused by misalignment of said shaft.

17. The invention as set forth in claim 16, wherein said clearance between said spherical surfaces may be maintained at a minimal value.

* * * * *